UNITED STATES PATENT OFFICE.

RAOUL DESGEORGE, OF LYON, FRANCE.

TREATMENT OF ALBUMINOUS SUBSTANCES.

No. 863,268.  Specification of Letters Patent.  Patented Aug. 13, 1907.

Application filed November 2, 1906. Serial No. 341,794.

*To all whom it may concern:*

Be it known that I, RAOUL DESGEORGE, a citizen of the French Republic, residing at Lyon, France, have invented a Process for the Treatment of Albuminous Substances, of which the following is a specification.

This invention relates to the treatment of certain substances having an albuminous base, for instance casein, for obtaining non-inflammable products in imitation of horn, shell, ivory, celluloid and the like.

The invention essentially comprises an electrolytic treatment by means of metal electrodes for the purpose of rendering the treated material insoluble and of coloring it if required.

The following description relates to the treatment of casein as an example. Either the dry casein of commerce or fresh casein, milk or whey may be used. The casein is diluted with a solution of chlorid of sodium the strength being varied according to the degree of transparency it is desired to obtain. The whole is then placed in an electrolytic bath in which are arranged metal electrodes of variable nature according to the results required. If for example copper electrodes are used, after the casein assumes a clear green color after the passage of the current for some moments owing to its combination with the oxid of copper freed by the electrolytic action and if the operation is prolonged the casein will assume a darker and darker green color owing to the greater absorption of oxid of copper, and will become completely insoluble. If lead or aluminium electrodes are used the casein will combine with the oxid of the respective metal and become insoluble but it will not assume any color; in which case it may be colored by means of anilin dyes if desired.

By this process it is thus possible to render casein completely insoluble by means of metallic oxids and to color it by the same oxids or it may be left uncolored. The insolubility arises from the large quantity of metallic oxids which combines with the casein and forms with the latter a casein compound of absolute insolubility.

The substance thus obtained either alone or mixed with other substances is then treated by known processes to reduce same to the form of sheets or various articles resembling horn, ivory, celluloid and the like.

The substance in the various forms mentioned and according to the uses to which it is to be put may be subjected to the action of the vapors of reducing bodies such as: formic acid, formaldehyde or to solutions of said bodies.

What I claim as my invention and desire to secure by Letters Patent of the United States is:—

1. Process for the treatment of albuminous substances consisting in diluting same with a solution of chlorid of sodium and submitting the product to an electrolytic treatment with the use of metallic electrodes.

2. Process for the treatment of albuminous substances consisting in diluting same with a solution of chlorid of sodium, and submitting the resultant to an electrolytic treatment with the use of metallic electrodes until insolubility is produced, said electrodes being of such nature as to impart color to the finished product.

In witness whereof I have signed this specification in the presence of two witnesses.

RAOUL DESGEORGE.

Witnesses:
GASTON JEAUNVAUX,
MARIN VACHON.